United States Patent
Senturk et al.

(10) Patent No.: US 7,729,964 B2
(45) Date of Patent: Jun. 1, 2010

(54) METHODS AND SYSTEMS FOR ANOMALY DETECTION IN SMALL DATASETS

(75) Inventors: Deniz Senturk, Niskayuna, NY (US); Murat Doganaksoy, Niskayuna, NY (US); Christina Ann LaComb, Schenectady, NY (US); Bethany Kniffin Hoogs, Niskayuna, NY (US); Radu Eugen Neagu, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 853 days.

(21) Appl. No.: 11/022,402

(22) Filed: Dec. 27, 2004

(65) Prior Publication Data

US 2006/0031150 A1    Feb. 9, 2006

Related U.S. Application Data

(60) Provisional application No. 60/599,511, filed on Aug. 6, 2004.

(51) Int. Cl.
*G06Q 40/00* (2006.01)
(52) U.S. Cl. .......................................... 705/35; 705/37
(58) Field of Classification Search .................. 705/35, 705/36, 37, 38, 39
See application file for complete search history.

(56) References Cited

U.S. PATENT DOCUMENTS

| | | | |
|---|---|---|---|
| 5,361,201 A * | 11/1994 | Jost et al. ....................... | 705/35 |
| 6,322,366 B1 * | 11/2001 | Bergan et al. ................ | 434/118 |
| 6,594,668 B1 * | 7/2003 | Hudy .......................... | 707/101 |
| 6,928,418 B2 * | 8/2005 | Michaud et al. ........... | 705/36 R |
| 7,024,388 B2 * | 4/2006 | Stefek et al. ................... | 705/38 |
| 7,127,418 B2 * | 10/2006 | Fuisz et al. ................... | 705/26 |
| 2003/0009368 A1 * | 1/2003 | Kitts ........................... | 705/10 |
| 2003/0061132 A1 * | 3/2003 | Yu et al. ........................ | 705/30 |
| 2004/0024674 A1 * | 2/2004 | Feldman ....................... | 705/36 |
| 2004/0064357 A1 * | 4/2004 | Hunter et al. ................. | 705/10 |
| 2004/0083150 A1 * | 4/2004 | Michaud et al. ............... | 705/36 |
| 2004/0088211 A1 * | 5/2004 | Kakouros et al. ............. | 705/10 |
| 2004/0133439 A1 * | 7/2004 | Noetzold et al. .............. | 705/1 |
| 2005/0004857 A1 * | 1/2005 | Schwarz et al. .............. | 705/36 |
| 2005/0071266 A1 * | 3/2005 | Eder ........................... | 705/38 |
| 2005/0125318 A1 * | 6/2005 | Jameson ....................... | 705/30 |

(Continued)

OTHER PUBLICATIONS

The relative power of three statistics for small sample destructive tests, Paul H Jacobson, Dec. 1947, p. 575.*

(Continued)

*Primary Examiner*—Alexander Kalinowski
*Assistant Examiner*—Bruce I Ebersman
(74) *Attorney, Agent, or Firm*—Scott J. Asmus

(57) ABSTRACT

A technique for detecting anomalous values in a small set of financial metrics makes use of context data that is determined based upon the characteristics of the target company being evaluated. Context data is selected to represent the historical values of the financial metric for the target company or the simultaneous performance of peer companies. Using the context data, an anomaly score for the financial metric is calculated representing the degree to which the value of the financial metric is an outlier among the context data. This can be done using an exceptional statistical technique. The anomaly score can be used to evaluate the risks associated with business transactions related to the target company.

23 Claims, 6 Drawing Sheets

U.S. PATENT DOCUMENTS

2005/0222928 A1* 10/2005 Steier et al. .................. 705/35
2006/0031150 A1* 2/2006 Senturk et al. ................ 705/35
2006/0167772 A1* 7/2006 Zilberman .................. 705/35

OTHER PUBLICATIONS

Top 5 Technology Companies Ranked by total revenue 2001, Portland Business Journal, May 24, 2002.*

Statsoft pdf—webarchive 20010401021248 Quality ocontrol charts, 14 pages.*

Robust Outlier Detection Scheme for Collaborative Sensor Networks LG Jayashree, Journal of Digital Information Management, Feb. 2007.*

An SPSS Implementation of Non-recursive outlier deletion procedure with shifting Z-score Criterion , (VanSelst and Jolicoeur 1994 ), Glenn L. Thompson University of Ottawa, Ottawa Ontario, Behavior Research Methods.2006, 344-352.*

Donna M. & Frederick W. Faltin, "Toe the Line: No More WorldComs," Quality Progress, Jan. 2003, pp. 29-35.

Michel Crouhy, Dan Galai & Robert Mark, "A Comparative Analysis of Current Credit Risk Models," Journal of Banking & Finance, (vol. 24) 2000, pp. 59-117.

Eric Falkenstein, Andrew Boral & Lea V. Carty, "RiskCalc TM for Private Companies: Moody's Default Model", White Paper, Moody's KMV, May 2000, http://www.moodyskmv.com/research/, pp. 1-92.

Amir F. Atiya, "Bankruptcy Prediction for Credit Risk Using Neural Networks: A Survey and New Results," IEEE Transaction on Neural Networks, Jul. 2001, pp. 929-935.

* cited by examiner

Traditional Z-Score

| Sample Size | Cut off 1 | 1.5 | 1.75 | 2 | 3 | 4 | 5 | 6 | 7 | 8 | 9 | 10 | 20 | 30 | 40 | 50 |
|---|---|---|---|---|---|---|---|---|---|---|---|---|---|---|---|---|
| 3 | 33.33% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| 4 | 33.45% | 0.00% | 0.00% | 0.00% | 0.00% | 0.00% | 0.00% | 0.00% | 0.00% | 0.00% | 0.00% | 0.00% | 0.00% | 0.00% | 0.00% | 0.00% |
| 5 | 26.05% | 6.14% | 0.29% | 0.00% | 0.00% | 0.00% | 0.00% | 0.00% | 0.00% | 0.00% | 0.00% | 0.00% | 0.00% | 0.00% | 0.00% | 0.00% |
| 6 | 32.47% | 9.67% | 2.85% | 0.04% | 0.00% | 0.00% | 0.00% | 0.00% | 0.00% | 0.00% | 0.00% | 0.00% | 0.00% | 0.00% | 0.00% | 0.00% |
| 7 | 32.26% | 10.55% | 4.11% | 0.84% | 0.00% | 0.00% | 0.00% | 0.00% | 0.00% | 0.00% | 0.00% | 0.00% | 0.00% | 0.00% | 0.00% | 0.00% |
| 8 | 32.19% | 11.02% | 4.89% | 1.51% | 0.00% | 0.00% | 0.00% | 0.00% | 0.00% | 0.00% | 0.00% | 0.00% | 0.00% | 0.00% | 0.00% | 0.00% |
| 9 | 32.06% | 11.41% | 5.46% | 2.03% | 0.00% | 0.00% | 0.00% | 0.00% | 0.00% | 0.00% | 0.00% | 0.00% | 0.00% | 0.00% | 0.00% | 0.00% |
| 10 | 31.89% | 11.78% | 5.87% | 2.37% | 0.00% | 0.00% | 0.00% | 0.00% | 0.00% | 0.00% | 0.00% | 0.00% | 0.00% | 0.00% | 0.00% | 0.00% |
| 20 | 31.86% | 12.66% | 7.10% | 3.57% | 0.05% | 0.00% | 0.00% | 0.00% | 0.00% | 0.00% | 0.00% | 0.00% | 0.00% | 0.00% | 0.00% | 0.00% |

FIG. 4

| | Normal | Modified Z-Score | | | | | | | | | | | | |
|---|---|---|---|---|---|---|---|---|---|---|---|---|---|---|
| | Cut off | | | | | | | | | | | | | |
| Sample Size | 1 | 1.5 | 1.75 | 2 | 3 | 4 | 5 | 6 | 7 | 8 | 9 | 10 | 20 | 30 | 40 | 50 |
| 3 | 52.68% | 37.95% | 32.48% | 28.38% | 18.24% | 13.26% | 10.54% | 8.77% | 7.50% | 6.60% | 5.87% | 5.38% | 2.67% | 1.79% | 1.36% | 1.11% |
| 4 | 48.13% | 32.39% | 26.80% | 22.40% | 12.02% | 7.20% | 4.69% | 3.27% | 2.46% | 1.86% | 1.49% | 1.25% | 0.30% | 0.14% | 0.09% | 0.06% |
| 5 | 43.61% | 27.06% | 21.51% | 17.12% | 7.56% | 3.79% | 2.10% | 1.25% | 0.81% | 0.54% | 0.40% | 0.27% | 0.03% | 0.00% | 0.00% | 0.00% |
| 6 | 41.30% | 24.35% | 18.61% | 14.31% | 5.22% | 2.08% | 1.01% | 0.50% | 0.25% | 0.12% | 0.09% | 0.06% | 0.00% | 0.00% | 0.00% | 0.00% |
| 7 | 39.64% | 22.44% | 16.68% | 12.31% | 3.79% | 1.32% | 0.59% | 0.28% | 0.15% | 0.08% | 0.04% | 0.03% | 0.00% | 0.00% | 0.00% | 0.00% |
| 8 | 38.55% | 21.09% | 15.30% | 10.96% | 3.03% | 0.97% | 0.37% | 0.15% | 0.06% | 0.04% | 0.02% | 0.01% | 0.00% | 0.00% | 0.00% | 0.00% |
| 9 | 37.43% | 19.50% | 13.78% | 9.63% | 2.40% | 0.66% | 0.20% | 0.07% | 0.03% | 0.02% | 0.01% | 0.01% | 0.00% | 0.00% | 0.00% | 0.00% |
| 10 | 37.00% | 19.17% | 13.56% | 9.52% | 2.18% | 0.53% | 0.12% | 0.05% | 0.02% | 0.00% | 0.00% | 0.00% | 0.00% | 0.00% | 0.00% | 0.00% |
| 20 | 34.36% | 16.10% | 10.54% | 6.68% | 0.90% | 0.11% | 0.01% | 0.00% | 0.00% | 0.00% | 0.00% | 0.00% | 0.00% | 0.00% | 0.00% | 0.00% |

FIG. 5

|  | Ab < -2 | -2 < Ab < 0 | 0 < Ab < 2 | Ab > 2 |
|---|---|---|---|---|
| Aw > 2 | 5 | 1 | 2 | 4 |
| 2 > Aw > -2 | -3 | 0 | 0 | 3 |
| Aw < -2 | -4 | -2 | -1 | -5 |

FIG.6

METHODS AND SYSTEMS FOR ANOMALY DETECTION IN SMALL DATASETS

CROSS REFERENCE TO RELATED APPLICATIONS

This application claims priority under 35 U.S.C. §119(e) from Provisional Application No. 60/599,511 filed on 6 Aug. 2004.

TECHNICAL FIELD

The systems and techniques described herein relate generally to identifying outlying data in small sets of data. More specifically, they relate to statistical techniques to quantify outlying financial data when compared to small sets of related financial data

BACKGROUND

Understanding the financial health of a company is an important factor in evaluating a potential business interaction with that company. An understanding of a company's financial health can be used to help evaluate the risks involved in doing business with that company, and can form a basis for predicting the expected benefits from the potential business relationship or transaction. However, fraudulent financial filings by the company can provide a misleading picture of the financial health of a company. Companies that engage in such fraudulent financial behavior can collapse in ways not reflected by the apparent financial health reflected by their financial information.

As a result of recent collapses of companies that were hiding their financial difficulties behind fraudulent financial data, investors and creditors are seeking ways to identify false or misleading financials before the time where the company's dire financial straits become apparent due to earnings shortfalls, scandals or bankruptcy.

While various subjective and intuitive approaches have been used to identify warning signs that might be detected in available financial data, these techniques tend to be time consuming and rely upon the particular expertise of well-trained individuals examining extensive financial data. Therefore, there is a continued need for improvement in the objectivity, ease of use, and speed of such techniques for detecting anomalous financial data.

BRIEF DESCRIPTION

In one embodiment of the systems and techniques described herein, a method for determining whether a financial metric that represents the performance of a target company is anomalous is presented. One aspect of such an embodiment involves identifying a target value as the value of the financial metric for the particular target company. Another aspect is collecting context data based upon the target company. Yet another aspect is calculating an anomaly score using the target value and the context data, using an exceptional statistical measurement. Another aspect is comparing the calculated anomaly score with a threshold value and considering the target value to be anomalous if the anomaly score exceeds the threshold value.

In a further embodiment of the systems and techniques described herein, a method for determining an anomaly score associated with a target financial metric for a target company is provided. One aspect of such an embodiment is identifying a target value associated with the target financial metric for the target company. Another aspect is to identify a set of context data based upon the target company. Yet another aspect of the embodiment is to generate a measure of the central tendency associated with the context data using an exceptional technique. An additional aspect is generating a measure of the variation of the context data using an exceptional technique. Still another aspect is calculating an anomaly score based upon the measure of central tendency, the measure of variation, and the target value.

Other aspects of the systems and techniques described herein that may be used in various embodiments: using context data that comprises financial metric data associated with the target company for other operating periods; using context data that comprises the value of the financial metric for each of a group of peer companies to the target company; identifying peer companies that are in the same industry as the target company; identifying peer companies that have a similar size to the target company; identifying companies of similar size based upon the value of a financial metric; selecting peer companies from an electronically searchable database of companies based upon the value of an additional financial metric; triggering an alarm based upon the determination that a target value is anomalous; calculating the measure of central tendency and/or the measure of variation using a technique that depends on the context data but no upon the target value; calculating the measure of central tendency by an exceptional mean; calculating the measure of variation by an exceptional deviation; using exceptional statistical techniques to calculate the measure of central tendency and/or the measure of variation; and using the techniques described herein on small sets of data, including sets of data having as few as 30, 20, 10 or 5 members.

BRIEF DESCRIPTION OF THE DRAWINGS

The above mentioned and other features will now be described with reference to the associated Figures. These Figures are intended to illustrate, but not to limit the invention.

FIG. 4 is a table that shows the conversion between one embodiment of a calculated anomaly score in a data set of a particular size and the likelihood that a value lies outside that magnitude of anomaly score.

FIG. 5 is a table that shows the conversion between a calculated z-score in a data set of a particular size and the likelihood that a value lies outside that magnitude of z-score.

FIG. 6 is a chart that can be used to assign an overall anomaly rating in one embodiment to a financial metric based upon the anomaly-within and anomaly-between scores for that metric.

DETAILED DESCRIPTION

Figure 1:
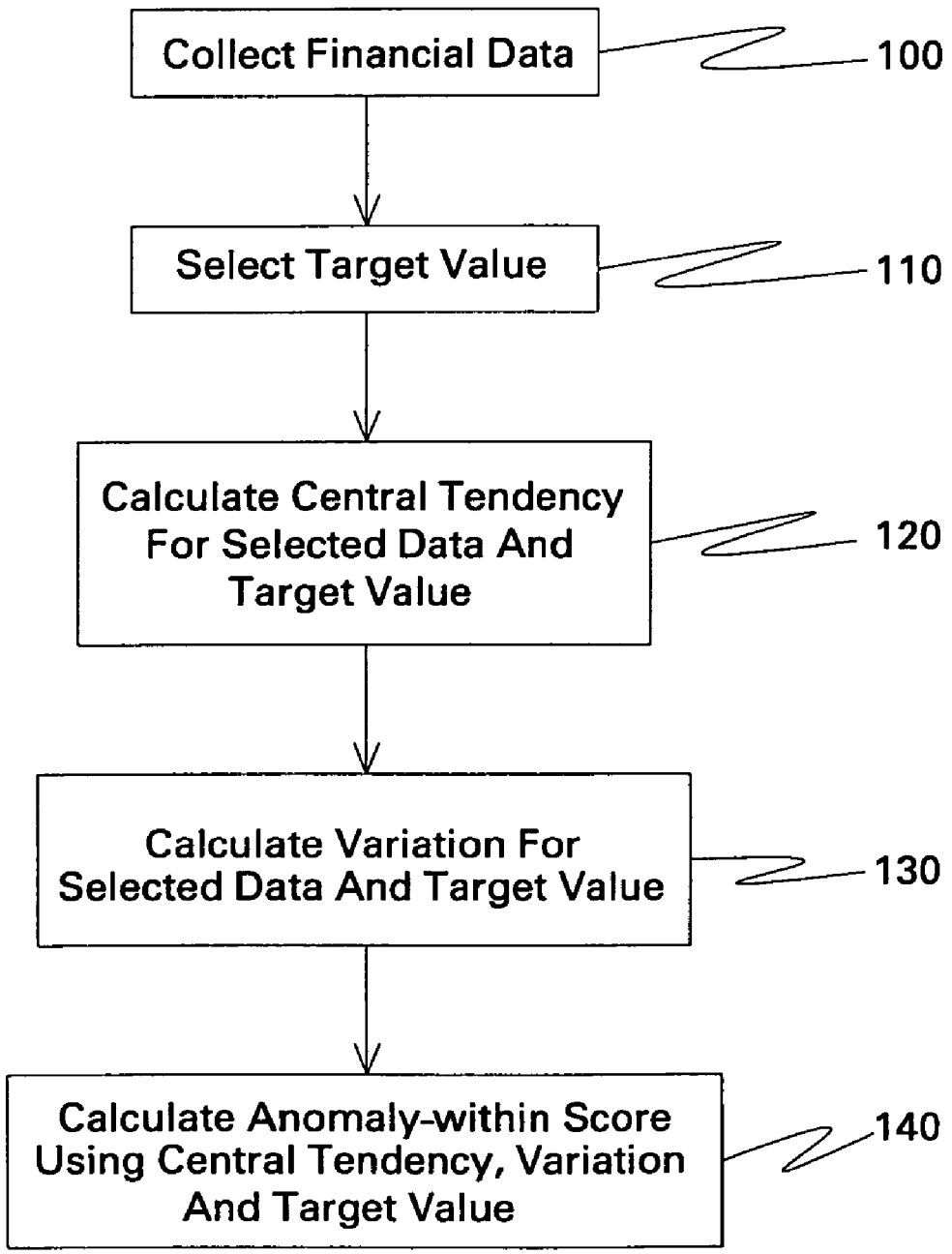
FIG. 1 illustrates a process for calculating an anomaly-within score in an embodiment of the described techniques.

Financial analysts, such as managers of investment portfolios, analysts working for companies extending credit, and loan officers, make decisions everyday based on perceptions of a company's financial health. Their basis for this perception is generally in large part taken from information on the company's financial statement. Taken at its simplest, such financial analysts look for any financial data that doesn't seem to fit in, either because it represents an unusual financial circumstance for the company (which may indicate poor financial health), or because it doesn't conform to the analyst's existing knowledge of the company's financial circumstances (which may indicate improper or fraudulent financial reporting). Such 'out of the ordinary' financial data is referred to generally as an 'anomaly'. A financial analyst would like to detect any financial anomalies as early as possible and with as great a degree of confidence as possible. Properly recognized and understood, financial anomalies can act as early warning signs of financial decline or fraud, which can allow an analyst to avoid transactions that are undesirable by recognizing developing problems before they happen.

In the discussion of the described systems and techniques below, the particular company of interest to a financial analyst or other investigator is referred to as the 'target' company. The target company is evaluated by determining values for one or more financial metrics and comparing to financial metric values for the same company at earlier times, as well as to the financial metrics for peer companies to the target company.

As discussed herein, a 'financial metric' may be any piece of financial data that is associated with the performance or operation of a company over a particular time period. For instance, a classic financial metric is net income. Other financial metrics include, but are not limited to: total revenue; inventory on hand; capital expenses; interest payments; debt; and earnings before interest, taxes, depreciation and amortization (EBITDA). While these and many other financial metrics are known in the art, their usage to identify financial anomalies has become progressively more difficult over time. As financial accounting has become increasingly complex, it has become more difficult to systematically identify financial statement fraud or financial decline.

Even when a broad scope of well-considered financial metrics is used to analyze the financial health of a target company, it can still be difficult to define whether a metric's value is higher or lower than it ought to be. Rather than simply calculating the value of the metric, the analyst would like to determine whether the financial metric's value is anomalous. To complicate matters further, the definition of an anomaly may change from one financial metric to the next. Limitations on anomalous values may also vary based on factors such as target company size, the industry in which the target company operates, and with the passage of time. In particular, changes over time can reflect both changes in the operation of the company, as well as changes in the overall economic environment.

In order to account for these variations and determine whether or not a given value for a financial metric for a target company is outside an expected range (i.e., anomalous), context information is used to form a basis for the analysis of the target company's financial metric data. This context information can be taken from two primary sources: the target company's past performance, and the performance of the target company's peers. By using such context information to quantify the typical amount of variation present within the industry or within the company's own performance, it is possible to systematically and rigorously compare current financial metric data to context data and accurately assess the level of anomalous financial data in the target company's financial statements. In particular, the techniques described herein are well-suited to identifying anomalous data in small sets of data. This is especially important because extensive data is often unavailable when evaluating companies, due to the need to select only relevant context data for comparison.

Identified financial anomalies in particular metrics can be used in various ways. Such identified financial anomalies can be used as the input for systems that evaluate financial health on the basis of these anomalies such as are known in the art. Such anomalies may also be used in multivariate and heuristic analysis techniques, such as those described in copending U.S. patent application Ser. No. 10/890,836 entitled "Method and System for Detecting Business Behavioral Patterns Related to a Business Entity" filed on 14 Jul. 2004, the entirety of which is hereby incorporated by reference herein. However, it will be understood by those of skill in the art that the analysis and calculation techniques described may be used in any circumstance where anomaly detection is desired for a target value within a data set.

As noted above, context information is used to properly evaluate the degree to which a given financial metric is anomalous. In order to have an effective evaluation, the context data is selected to be appropriately relevant to the target financial metric for the target company. When selecting the appropriate context data over the time domain, it is generally desirable to look at the closest data available to the time period of interest. Since the time period of interest is usually the most recent data available, the appropriate scope of time to consider is a sequence of the most recent financial data available for the company—for example, the data corresponding to the last 3 years, in one embodiment.

Proper context data to take into account the financial behavior of the industry and overall economic environment is found by using an appropriate group of 'peer' companies to the target company. A group of companies from the same industry and of similar size is selected to act as the appropriate peer group for the target company. "Similar size" may be determined by comparing one or more of a variety of indices of size. In one particular embodiment, "similar size" is determined by total sales. It will be understood that a variety of measurements, including the financial metrics themselves, can be used as the index of size. It is generally desirable to choose the peer group such that the target company lies in the middle of the group as measured by the selected index of size. This provides equal representation in the peer group of companies that are larger and smaller than the target company.

In a further particular embodiment, the peer companies may be selected from the group of companies that are classified within the same Standard Industrial Code (SIC) as the target company. If a database of companies with appropriate financial data is available, such as the database of information made available by Mergent, Inc., the peer group can be selected to be the companies in the database in the same SIC as the target company, and exhibiting the next four highest and next four lowest values for the index of size, e.g., total sales. It will be understood that other sizes groups of adjacent sized companies can be chosen, but that as noted above, it is desirable to maintain a group of peer companies to both sides of the target company's size.

In the event that there are not four companies that exhibit indices of size greater than the target company, it can often be effective to compare metrics that have been normalized by the appropriate size metric. For instance, if using a target metric of outstanding debt to evaluate a target company, each peer company's debt could be normalized by being divided by that company's total assets, for example. Other financial metrics could also be used for normalization, including but not limited to total revenue or market capitalization.

By establishing the appropriate context, both in time and across the industry to the peers of the target company, the need for a subjective assessment as to whether a given financial metric is anomalously high or low can be avoided, and objective and automatic calculation can be made to detect and quantify financial anomalies.

Note that it is the case that a value can be either anomalously high, or anomalously low. While there generally is a particular direction that is recognized as being the preferable trend in a value (e.g., it is generally better to have high revenues than low revenues), it should be noted that this technique is designed to identify and quantify anomalies regardless of their polarity. This allows for the evaluation of data that appears to be "too good to be true" and may in fact represent a misleading or suspicious value for a financial metric. It also can be significant for detection of anomalies identified by simultaneous behavior of more than one financial metric.

By using these techniques to detect anomalies, 'alarms' and 'red flags' can be created. An alarm results from an anomalous value in a single metric (either high or low) when evaluated in comparison to the context. For example, when compared to its peers, unusually slow collection of receivables for a company could be used to trigger an alarm. This could be determined by calculating an anomaly-between score (discussed further below) for the target company for the financial metric of 'days sales outstanding', and finding the resulting score to be greater than 2. Another example would be a significant decline in the sales volume for a company over time, represented by an anomaly-within score (discussed below) for the financial metric of total revenue being less than −2. The calculation of these 'anomaly-within' and 'anomaly-between' scores will be discussed in greater detail below. The technical effect of such techniques for calculating anomaly scores is to allow such systems to objectively and automatically detect circumstances that can be used to identify financial data that indicates unhealthy or fraudulent finances at the target company.

A red flag represents an aggregation of alarms triggered on related measures. For example, a red flag might be triggered in the event of anomalously high revenue combined with anomalously high inventory value. By combining the individual information, the decision to signal a red flag will be based on bringing together information from several (potentially different) sources, which will increase the likelihood of catching an actual event and can be used to minimize false alarms.

In order to evaluate whether or not a given metric is an anomaly, an 'anomaly score' for that financial metric for the target company can be calculated. For a given target company, each financial metric can be analyzed to determine the degree to which the value for that metric is different from the appropriate context data for that company and that metric. Depending on the nature of the context used (i.e., over time as opposed to across an industry), there are two different types of anomaly scores that 'Anomaly-within' scores are scores calculated based upon the set of data representing a particular financial metric for a target company taken over different time periods. For instance, this data may represent financial metrics from successive fiscal quarters. The target value is generally the most recent value of the metric. In this way, anomaly-within scores measure a given company's financial data against its own past performance.

'Anomaly-between' scores are scores based upon the set of data for a given financial metric taken for a target company and a group of peer companies, all for the same time period. This data may represent the performance of a group of similarly situated companies all considered in a particular fiscal quarter. The anomaly-between scores measure a given company's financial data against the performance of its peer group.

The financial metrics that can be used to calculate these anomaly scores can include any of the financial metrics discussed herein, and may be taken from any source that provides appropriate data for comparison. These sources can include, but are not limited to: balance sheets, income statements, and cash flow statements, as well as metrics that are output by other financial analysis techniques.

Such information can be manually located and collated, or can be identified automatically. In addition to techniques known in the art for reading and analyzing sources of financial data, additional techniques that may be of use are described in copending U.S. patent application Ser. No. 10/401,310 entitled "Mathematical Decomposition of Table-Structured Electronic Documents" filed on 27 Mar. 2003, copending U.S. patent application Ser. No. 10/400,982 entitled "Automated Understanding and Decomposition of Table-Structured Electronic Documents" filed on 27 Mar. 2003, and copending U.S. patent application Ser. No. 10/401,259 entitled "Automated Understanding, Extraction and Structured Reformatting of Information in Electronic Files" filed on 27 Mar. 2003, the entirety of all of which is hereby incorporated by reference herein.

As noted above, one statistical technique to evaluate the degree to which a particular value in a group is an outlier, i.e. is anomalous, is to calculate what is known as a 'z-score' for the value in the group. Typical z-scores are based upon a calculation of the mean and the standard deviation of the group, and the technique for calculating z-scores is well known in the art. While such a statistical technique can be effective in evaluating the degree to which a single entry is anomalous in a well-populated group, z-scores can be shown to lose their effectiveness as an indication of anomalousness when used on sets of data that have only a few values. This will be discussed further with respect to FIG. 5 below. This lack of discriminating power with small data sets limits the utility of a z-score in financial analysis as discussed herein.

When calculating anomaly scores, it is often the case that there are only a few values with which to work. This is because of the inherent limitations of the comparisons that the financial analyst is trying to make. For instance, when comparing to peer companies, it is often the case that it is difficult to identify more than a handful of companies that can legitimately be considered peers of the target company. This is especially true in industries that are newly created, strongly consolidated, or in which there is a large dominant company. Similarly, when comparing to past financial performance of a company, it is often the case that data is only available or relevant for a limited period of time prior to the current date for the target company. For instance, an acquisition or divestiture can have a significant effect on a company and effectively render its past financial data unsuitable for comparison to its current financial data. In addition, it is desirable to evaluate the performance of companies that may only have existed for a limited period of time.

As a result, it is often not desirable to use standard z-scores as a measurement for anomaly scores. Therefore, while anomaly scores need not be z-scores, they may still use certain elements that are similar to those used in calculating the z-score. For instance, standard z-scores are based on a measurement of the central tendency of the group, and the variation within the group. In calculating a z-score, the central tendency is represented by the mean of the group, while the variation is represented by the standard deviation of the group. While the anomaly score presented herein is not a z-score, it still makes use of measurements of central tendency and variation for the group being evaluated.

The anomaly score calculation may be generally of the form $$A = \frac{Xt - CT}{V} \quad \text{(Equation 1)}$$

where A is the anomaly score, Xt represents the target value, CT represents a measure of central tendency of the set, and V represents a measure of the variation in the set. As will be understood by those of skill in the art, the measure of central tendency may include any number of different calculations that describe the central tendency of the set of values, including but not limited to: mean, geometric mean, median, and mode. Similarly, those of skill in the art will appreciate that any of a variety of measures of variation may be used as well, including but not limited to: range, variance, standard deviation, coefficient of variance, and standard error. It will also be understood that the measurements of central tendency and variation may be based on more than one of the types of calculations, for instance, the measure of central tendency could be a weighted average of the mean and the mode, based upon the number of occurrences of the mode value among the data.

As an example of the technique described above, it can be seen that if the central tendency were to be represented by the mean and the variation were to be measured by the standard deviation, the anomaly score being calculated would be equivalent to an ordinary z-score. As noted above, such a z-score is only effective as an anomaly score for very large sets of data. However, as discussed above, there are many circumstances in financial analysis where large pools of relevant context data are not available. When working with such smaller sets of data, the limitations in the discriminatory power of a z-score become severe.

A set of techniques based upon the use of 'exceptional' statistical calculations are described herein that enable financial analysts to perform the desired forms of analysis on small sets of data, while retaining the ability to identify anomalous values within that small set. In general, an 'exceptional' technique, also referred to as an exceptional statistical technique or an exceptional measurement, may be defined as a technique for calculating a statistical value associated with a set of data and a target value, such that the target value is excluded from the calculation of the exceptional measurement. Examples will be discussed in greater detail below. By using an exceptional technique, the particular target value within a group is prevented from skewing the measurements used to characterize that group.

The use of exceptional techniques has little effect on large bodies of data. This is because as the size of the data set increases, eliminating a single target value from the set of data being used to calculate a measure of central tendency or variation for that set is of little importance. The elimination of any single value is unlikely to have a large effect on the result of the calculation. As a result of this, the difference between the z-score and an anomaly score making use of an "exceptional" technique becomes infinitesimal for a large body of data.

However, when working with a small body of data, each value in the set can exert a much more significant effect on the result of calculations of measures of central tendency or variation. As a result, a strongly anomalous value in a small data set can tend to dominate traditional measures of central tendency and variation to the point where the anomalous value does not appear to be anomalous at all. In such circumstances, the difference between an "exceptional" anomaly score and a z-score are significant. The use of these "exceptional" calculations allow the anomaly score to be effective at discriminating anomalous data even within small data sets under circumstances where a traditional z-score would not, as will be discussed below.

As noted above, 'exceptional' measurements for central tendency and variation are used in one embodiment of an effective anomaly score calculation. In particular embodiments, techniques making use of the 'exceptional mean' and the 'exceptional deviation' are used.

In accordance with the definition provided above, the 'exceptional mean' is the mean of a set of data, excluding the target value. For example, consider the set of five values comprising 4, 5, 12, 13, and 16. The ordinary mean of this set of data is 10 (the sum of the values is 50, which when divided by the number of values, yields 10). However, the exceptional mean for this set of data, when the third value, 12, is the target value, is 9.5 (the sum of the four values in the set excluding the target value is 38, which when divided by the number of values excluding the target value, yields 9.5).

In a similar manner, the 'exceptional deviation' is the standard deviation of the set of data when the target value is excluded from the set of data. For example, consider the set of five values discussed above: 4, 5, 12, 13, and 16. The ordinary standard deviation is calculated by taking the square root of the variance about the mean of the group (in this case, the standard deviation is approximately 5.2). However, if the target value we are using in our anomaly score is the third value (i.e., 12), then the exceptional deviation is the standard deviation of the set comprising: 4, 5, 13 and 16 (approximately 5.9).

Note that the exceptional mean and exceptional deviation for a group may change depending upon which value in the group is the target value. Also note that in our example above, the exceptional mean is smaller than the ordinary mean, while the exceptional deviation is larger than the standard deviation.

An embodiment of a technique for calculating the anomaly-within score for a financial metric for a particular target company will now be described with reference to FIG. 1. In step 100, the financial metric data for the target company are collected, including historical data over the previous time periods for the company. As noted above, this data may represent data for successive quarters, or such other time periods as are available. It is generally desirable that each time period is roughly comparable (i.e., each represents a single quarter, or a single year, or some other uniform basis). In a particular embodiment this data may represent the particular financial metric for each quarter in the previous three years.

In step 110, a target value is chosen. When calculating anomaly-within scores, this value is generally the most current value, i.e., the value for the most recent time period. In step 120, a central tendency value is calculated for the set of financial data collected. In a particular embodiment, the mean of the data is calculated. As used herein, the word 'mean' can be taken to generally include both arithmetic and geometric means. However, when used without the prefix 'geometric', it will be generally understood to be an arithmetic mean. In step 130, a measure of variation is calculated for the data. In a particular embodiment, the exceptional deviation based upon the selected target value is used as a measure of the variation.

In step 140, the anomaly-within score is calculated using an appropriate formula, such as that shown above in Equation 1. As noted herein, in a particular embodiment of the technique, the central tendency is represented by the exceptional mean, and the variation is represented by the exceptional deviation.

In the case of an unusually high magnitude for the anomaly score, the score may be limited to an appropriate threshold value. For instance, in a particular embodiment, it has been found that anomaly-within scores greater than 150 or less than −150 are not useful beyond the fact that they are very anomalous. In such an embodiment, values greater than 150 may be assigned the value of 150, and values less than −150 may be assigned the value of −150.

Figure 2:
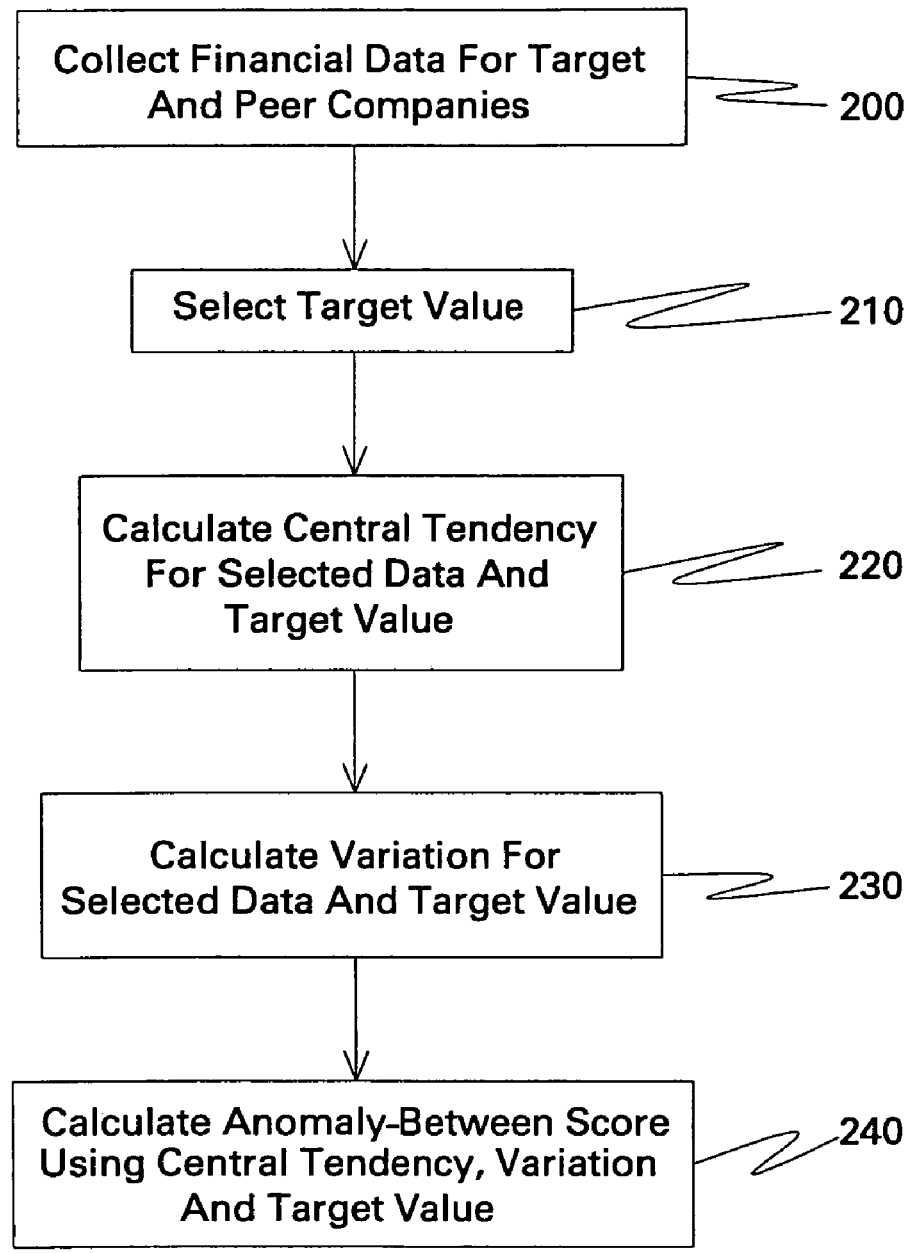
FIG. 2 illustrates a process for calculating an anomaly-between score in an embodiment of the described techniques.

An embodiment for a technique for calculating an anomaly-between score for a particular financial metric is shown in FIG. 2 and described below. In step 200, financial metric data for the target company and a group of peer companies is collected. Peer companies may be selected as discussed above, or in any other way that produces a group of companies that are relevant for comparison with the target company. Financial data for the same time period for each of the companies is selected. In step 210, the target value is identified. This will be the value of the metric for the target company.

In step 220, a measure of the central tendency for the set of data is calculated. In a particular embodiment, this is an exceptional mean of the data set. In step 230, a measure of variation for the set is determined. In a particular embodiment, this is an exceptional deviation for the set of data. In step 240, an anomaly score based upon the determined target value, central tendency and variation is calculated. For instance, Equation 1 may be used for this calculation in a particular embodiment.

As described above with respect to the anomaly-within score, a threshold value may be applied to limit unusual values of the anomaly-within score to fall within a particular range, e.g., −150 to 150.

Figure 3:
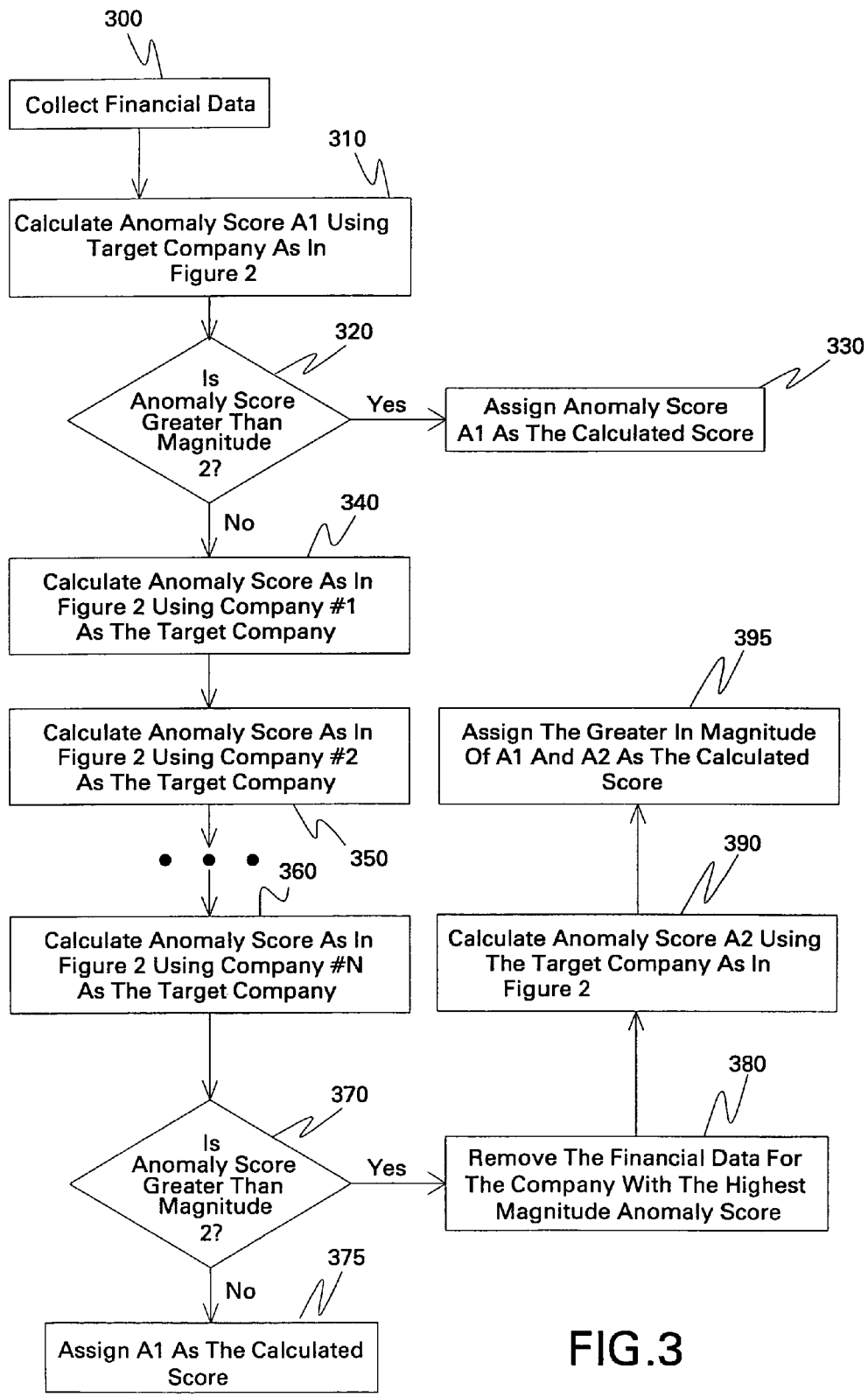
FIG. 3 illustrates a process for calculating an anomaly-between score in another embodiment of the described techniques.

An alternate embodiment for calculating an anomaly-between score is shown in FIG. 3. In this alternate embodiment, financial data are collected for a particular financial metric for a target company and a peer group, as described above. This is done in step 300. The technique described in FIG. 2 is then performed on this set of data in step 310, using the selected target company as the target in the basic technique of FIG. 2. If the anomaly score of the target company has a magnitude greater than 2, i.e., it is greater than 2 or less than −2 (step 320), then the anomaly-between score for the target company is the calculated anomaly score (step 330).

If in step 320 the magnitude of the anomaly score for the target company is 2 or less, then the process described in FIG. 2 is performed for the set of data as if each of the other companies in the peer group were the target company (steps 340, 350, 360). This produces an anomaly-between score for each company in the group. If exactly one of the anomaly-between scores produced has a magnitude greater than 2 (step 370), then the company corresponding to that high magnitude score is removed from the peer group (step 380), and the technique in FIG. 2 is repeated with the original target company as the target (step 390). The anomaly score produced from step 310 is compared to the anomaly score produced in step 390, and the anomaly-between score is assigned whichever value is larger in step 395.

The technical effect of such anomaly score calculations can be to determine whether or not a given value is flagged as an anomaly and triggers an alarm. For instance, anomaly scores with a magnitude greater than a particular cut-off can be defined as indicating an anomalous value. In selecting the cut-off value for the anomaly score at which to trigger an alarm, it is generally desirable to take into account the size of the data set that was being worked with. In general, when working with larger data sets, a greater degree of significance can be associated with a smaller increase in the magnitude of the anomaly score.

FIG. 4 is a table showing the likelihood that a random value in a data set of a given sample size (shown in the first column 410) will have an anomaly score with a magnitude greater than the cut-off value shown in the top row 420. This table is based upon the anomaly score definition discussed above that makes use of the exceptional mean to measure central tendency and the exceptional deviation to measure variation. This chart was determined using a Monte Carlo numerical simulation technique as known in the art, and represents the appropriate values for a two-tailed, normal distribution. It will be understood that a similar chart can be calculated using other distributions, such as Poisson or triangular distributions, or for single-tailed distributions.

FIG. 5 is a table showing a similar chart to FIG. 4 for the standard z-score. As can be seen by comparing the charts, although standard z-scores provide little discriminatory power for small data sets, the anomaly scores as calculated using the techniques described herein provide for a much more finely grained discrimination, even in data sets with five or fewer values.

By using FIG. 4, it is possible to select a cut-off value that represents the level at which a value is considered anomalous. This cut-off value for the anomaly score is referred to as the 'nominal' or 'threshold' variation.

In addition to using FIG. 4 to select appropriate cut-off values to use in setting alarms, red flags, or other triggers, the comparison of FIGS. 4 and 5 also illustrates a manner in which one can determine the size of a set that can be considered 'small' within the context of the techniques disclosed herein. As discussed above, the anomaly scores based upon exceptional statistical techniques are useful in identifying outliers even in small data sets, while traditional techniques, such as the z-score, lose discriminatory power in such small data sets. Therefore, the degree to which an anomaly score is effective at identifying outliers on a set of a given size, but a z-score is not, is an indication of those sets which are small.

By looking at the data provided in FIGS. 4 and 5, it can be seen that for sets of sample size smaller than 10, z-scores lose almost all discriminatory power. However, anomaly-scores using exceptional techniques continue to provide effective discrimination even for sample sizes as small as 3 or 4 values. As the sample size is increased, the z-scores begin to gain some effectiveness, but the anomaly scores remain more effective at distinguishing outlying values for samples sizes up to about 20. For samples of size larger than 30 (not illustrated in the Figures), the difference between a z-score and an anomaly score becomes small.

As a result, for techniques as described herein, and for distributions such as those used for calculating FIGS. 4 and 5 (double-tailed, normal distributions), small data sets are those data sets with less than 20 members. More particularly, a small data set may have less than 10 members in some embodiments. In particular embodiments, a small data set may have as few as four members.

As discussed above with respect to creating different charts to determine cut-off values if different distributions were to be used, it is also the case that such charts could be used to determine the effective limit of z-scores in circumstances where other distributions were used. Such charts could be created using numerical simulation techniques such as are known in the art, and could be used to extend the definition of 'small' data sets in any circumstances where it was found that a z-score was an ineffective discriminator of outliers but an anomaly score using an exceptional technique provided useful identification of outlying values.

As mentioned earlier, the use of context allows for the central tendency and variation used in the anomaly score calculations to vary, based upon the values observed in the context data. This allows the calculations of anomaly score to be sensitive to changes over time (when performing anomaly-within score calculations), as well as sensitive to the particular behavior of the relevant segment of the target company's industry (when performing anomaly-between calculations). Such a feature provides a natural ability for the anomaly detection to dynamically adjust itself based upon the context data in response to the changes over time or industry that the context data reflects.

FIG. 6 illustrates a chart that may be used in assigning an overall anomaly rating based upon the anomaly-within and anomaly-between scores for a given target company in a given peer group. The rating is assigned by locating the value within the cell at the intersection of the row corresponding to the appropriate range in the first column 610 of the anomaly-within score of the target company, and the column corresponding to the appropriate range in the bottom row 620 of the anomaly-between score of the target company. Unlike the anomaly scores themselves, this anomaly rating is simply an indicator of the general degree to which the particular financial metric is anomalous, rather than a calculated score.

The various embodiments of identifying outlying values in small sets of data described above thus provide a way to analyze even small sets of financial metrics to identify and quantify anomalous financial performance. These techniques and systems also provide a technique that can be carried out in an automated fashion, for example by a computer system, without reliance upon extensive human oversight or the application of subjective human judgment.

Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

Furthermore, the skilled artisan will recognize the interchangeability of various features from different embodiments. For example, the use of automated selection of industry peers as described with respect to one embodiment can be adapted for use with the anomaly scoring techniques described with respect to another. Similarly, the various features described, as well as other known equivalents for each feature, can be mixed and matched by one of ordinary skill in this art to construct analysis techniques in accordance with principles of this disclosure.

Although the systems herein have been disclosed in the context of certain preferred embodiments and examples, it will be understood by those skilled in the art that the invention extends beyond the specifically disclosed embodiments to other alternative embodiments and/or uses of the systems and techniques herein and obvious modifications and equivalents thereof. Thus, it is intended that the scope of the invention disclosed should not be limited by the particular disclosed embodiments described above, but should be determined only by a fair reading of the claims that follow.

What is claimed is:

1. A computer readable medium having computer executable instructions executing a method for determining whether a financial metric representing the performance of a target company has an anomalous value, the method comprising:

identifying a target value, the target value being the value of the financial metric associated with the target company;

collecting context data based upon the target company, wherein the context data is a small data set;

computing non-traditional z-score statistical measurements using the context data with the target value excluded;

calculating an anomaly score with a computer using the target value and the non-traditional z-score statistical measurements, wherein calculating the anomaly score is performed using an equation of the form $$A = \frac{Xt - CT}{V}$$

where A is the anomaly score, Xt is the target value, CT is a measure of the central tendency, and V is a measure of variance; and comparing the anomaly score with a threshold value such that if the anomaly score exceeds the threshold value, the target value is considered to have said anomalous value.

2. The computer readable medium of claim 1 wherein the context data comprises financial metric data for the target company for other operating periods.

3. The computer readable medium of claim 1 wherein the context data comprises the value of the financial metric for each of a group of peer companies.

4. The computer readable medium of claim 3 wherein the peer companies are in the same industry as the target company.

5. The computer readable medium of claim 4 wherein the peer companies have the same Standard Industrial Classification as the target company.

6. The computer readable medium of claim 3 wherein the peer companies are companies having a size similar to the target company.

7. The computer readable medium of claim 6 wherein size is evaluated on the basis of an additional financial metric.

8. The computer readable medium of claim 7 wherein the additional financial metric is total revenue.

9. The computer readable medium of claim 3 wherein the peer companies are selected from a database of companies based on the value of an additional financial metric.

10. The computer readable medium of claim 9 wherein the peer companies are those companies that have the same Standard Industrial Classification as the target company and have either: one of the four largest total revenues that are less than the total revenue of the target company, or one of the four smallest total revenues that are greater than the total revenue of the target company.

11. The computer readable medium of claim 1 wherein the determination that a target value is anomalous is used to trigger an alarm based upon the financial metric whose value is anomalous.

12. The computer readable medium of claim 1 wherein the determination that a target value is anomalous is used by a system to determine business behavior patterns.

13. The computer readable medium of claim 1 wherein the small data set has no more than 30 elements.

14. The computer readable medium of claim 1 wherein the small data set has no more than 20 elements.

15. The computer readable medium of claim 1 wherein the small data set has no more than 10 elements.

16. The computer readable medium of claim 1 wherein the small data set has no more than 5 elements.

17. A method for determining an anomaly score, the method comprising:

identifying a target value for the anomaly score;

identifying a set of context data for the target value, wherein the context data is a small set of data;

generating by a computer a measure of central tendency for the small set of data using a small data set technique with the target value excluded;

generating by the computer a measure of variation for the small set of data using a small data set technique with the target value excluded; and calculating by the computer said anomaly score based upon the measure of central tendency, the measure of variation, and the target value, wherein the anomaly score is calculated by $$A = \frac{Xt - CT}{V}$$

where A is the anomaly score, Xt is the target value, CT is the measure of central tendency, and V is the measure of variation.

18. The method of claim 17 wherein the measure of the central tendency is a small data set mean.

19. The method of claim 17 wherein the measure of the variation is a small data set deviation.

20. The method of claim 17 wherein the small set of data has no more than 30 elements.

21. The method of claim 17 wherein the small set of data has no more than 20 elements.

22. The method of claim 17 wherein the small set of data has no more than 10 elements.

23. The method of claim 17 wherein the small set of data has no more than 5 elements.

* * * * *